(12) United States Patent
Okuyama et al.

(10) Patent No.: US 6,543,014 B1
(45) Date of Patent: Apr. 1, 2003

(54) DATA TRANSMITTING/RECEIVING APPARATUS FOR EXECUTING DATA RETRANSMISSION AND PARALLEL PROCESSOR SYSTEM

(75) Inventors: Tsuyoshi Okuyama, Hadano (JP); Koji Nunogawa, Hadano (JP); Miki Miyaki, Hadano (JP)

(73) Assignees: Hitachi, Ltd., Tokyo (JP); Hitachi Information Technology Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/386,302

(22) Filed: Aug. 31, 1999

(30) Foreign Application Priority Data

Sep. 1, 1998 (JP) .......................... 10-246751

(51) Int. Cl.⁷ .................. G01R 31/28; G08C 25/02; H04L 12/28
(52) U.S. Cl. .................. 714/712; 714/18; 714/748; 370/412
(58) Field of Search ............... 714/748, 712, 714/18, 412; 370/352, 412; 710/52; 709/250

(56) References Cited

U.S. PATENT DOCUMENTS

| | | | |
|---|---|---|---|
| 5,265,103 A | * 11/1993 | Brightwell | 370/245 |
| 5,612,953 A | * 3/1997 | Olnowich | 370/367 |
| 5,742,761 A | * 4/1998 | Olnowich et al. | 370/355 |
| 5,781,551 A | * 7/1998 | Born | 370/258 |
| 6,112,323 A | * 8/2000 | Meizlik et al. | 714/748 |
| 6,170,048 B1 | * 1/2001 | Wing So | 712/31 |
| 6,189,122 B1 | * 2/2001 | Cheng | 370/216 |
| 6,263,374 B1 | * 7/2001 | Olnowich et al. | 709/250 |

FOREIGN PATENT DOCUMENTS

JP 5-61798 3/1993

\* cited by examiner

*Primary Examiner*—Albert Decady
*Assistant Examiner*—Cynthia Britt
(74) *Attorney, Agent, or Firm*—Mattingly, Stanger & Malur, P.C.

(57) ABSTRACT

Each of processing nodes and switching apparatuses constituting a parallel processor system is provided with data transmitting/receiving apparatuses 100 and 200. The data transmitting/receiving apparatus 100, in response to an instruction from a processor P within its own node, transmits data stored in a transfer data buffer 110 to the data transmitting/receiving apparatus 200 of a switching apparatus connected thereto. The data transmitting/receiving apparatus 200 receives data that are transferred, and stores them into a transfer data buffer 210. If any error in receive data is detected by an error detector 214 of the data transmitting/receiving apparatus 200, a retransmission request signal 10 is issued from a retransmission control circuit 215 to the retransmission control circuit 114 of the transmitting apparatus 100. The retransmission control circuit 114, upon receiving the retransmission request signal 10, instructs a data transmission control signal 112 to execute retransmission. The data transmission control circuit 112 causes the buffer control circuit 111 to subtract an established value from a read pointer, and reads out of the transfer data buffer 110 again and retransmits a single frame equivalent of data.

6 Claims, 8 Drawing Sheets

DATA TRANSMITTING/RECEIVING APPARATUS FOR EXECUTING DATA RETRANSMISSION AND PARALLEL PROCESSOR SYSTEM

BACKGROUND OF THE INVENTION

The present invention relates to a data transmitting/receiving apparatus, and more particularly to a data transmitting/receiving apparatus having a function retransmit data in the event of the occurrence of any transfer error.

A parallel processor system in which a plurality of processing nodes are connected by a network performed retransmission, even where a transfer error occurred within the network during a data transfer between processing nodes, from the processing node on the transmitting side.

This prior art will be described more specifically below.

FIG. 9 is a block diagram illustrating the parallel processor system according to the prior art.

In this parallel processor system, N processor elements 600 (1) to (N), each having a data transferring apparatus 608 provided with a data transmitting apparatus 300 and a data receiving apparatus 400 are connected to one another via an interconnecting network 700.

In FIG. 9, each of the processor elements 600 (1) to (N) has a processor 602, a memory 604, an internal bus 606 and a data transferring apparatus 608 for data communication with other processor elements. Between the data transferring apparatuses 608 of the processor elements 600 (1) to (N) and the interconnecting network 700 are provided external buses 612 (1) to (N), respectively.

Suppose that a transfer error arises within the interconnecting network 700 in this parallel processor system when data are transferred from the processor element 600 (1) to the processor element 600 (N) for instance. Then, on the basis of the actions of the data transmitting apparatus 300 and the data receiving apparatus 400 to be described below, the destination processor element 600 (N) detects a reception error ensuing from this transfer error, and a retransmission request signal is transmitted from the data transferring apparatus 608 in the processor element 600 (N) to the processor element 600 (1). The processor element 600 (1), upon receipt of the retransmission signal, temporarily interrupts its transfer processing, and retransmits the data in which the transfer error arose from the data transferring apparatus 608 in the processor element 600 (1).

FIG. 7 shows a block diagram of the data transmitting apparatus 300 and the data receiving apparatus 400 the data transferring apparatus 608 in a processor element 600 is equipped with. Whereas these apparatuses, provided in the data transferring apparatus 608 of each processor element, transmit and receive data, the description with reference to FIG. 7 supposes that the data transmitting apparatus 300 and the data receiving apparatus 400 are provided in separate processor elements, and data transfers are performed between them.

The data transmitting apparatus 300 is provided with a FIFO memory 302, a FIFO control circuit 304, an ECC circuit 306, a data latch 308, a data selector 310 and a data transmission control circuit 312. And the data transmitting apparatus 300 successively transmits data 16 and, any error is detected of the transmitted data in the data receiving apparatus 400, receives a retransmission request signal 18 returned from the data receiving apparatus 400.

On the other hand, the data receiving apparatus 400 is provided with a data receiving circuit 402 equipped with a data latch 404 and an ECC circuit 406, a FIFO memory 408, a FIFO control circuit 410 and a data reception control circuit 412. Of these, the data latch 404 is a circuit for receiving the data 16 from the data transmitting apparatus 300.

When performing data transmission, the data transmission control circuit 312 in the data transmitting apparatus 300 gives an instruction to the FIFO control circuit 304 to have a datum taken out of the FIFO memory 302. And it causes the data selector 310 to select the datum that has been taken out and to transmit them as the data 16, and causes the data latch 308 to hold that datum. The data transmission control circuit 312 in this manner causes a certain datum (datum n+1) and, having this datum held by the data latch 308, causes the FIFO control circuit 304 to take out the succeeding datum (datum n+2) from the FIFO memory 302 and the data selector 310 to transmit it. After that, it judges the presence or absence of a retransmission request signal for the earlier transmitted datum n+1.

If it finds, as a result of judgment, that no retransmission request signal 18 for the datum n+1 has been received, it has the datum n+2 held by the data latch 308, and updates the datum n+1 held within the data latch until then. And it causes the FIFO pointer of the FIFO control circuit 304 to be updated. After that, it causes the FIFO control circuit 304 to take out the succeeding datum (datum n+3) from the FIFO memory 302 and the data selector 310 to transmit this datum n+3, thereby executing a series of consecutive data transmitting actions.

On the other hand, if it finds, as a result of judgment, that a retransmission request signal 18 for the datum n+1 has been received, it causes the data latch 308 to keep the datum n+1 instead of holding the data n+2, and forbids the FIFO control circuit 304 from updating the FIFO pointer. And it executes the retransmitting action of causing the data n+1, held by the data latch 308, to be transmitted to the data selector 310 as the retransmit datum.

When receiving data, the data reception control circuit 412 in the data receiving apparatus 400 causes the data receiving circuit 402 to receive data sent from the data transmitting apparatus 300. And it causes the data outputted from the data receiving circuit 402 to be stored into the FIFO memory 408.

The data reception control circuit 412, after having a certain datum (datum n+1) stored into the FIFO memory 408 in this manner, causes the next datum sent from the data transmitting apparatus 300 to be received by the data latch 404. After that, it judges the generation or non-generation of an error detection signal 17 for the datum n+1 by the ECC circuit 406. In this process, the FIFO pointer of the FIFO control circuit indicates the area into which the datum n+1 was stored out of all the areas of the FIFO memory 408.

If it is found, as a result of judgment, that no error detection signal 17 for the datum n+1 has been generated, the FIFO pointer of the FIFO control circuit 410 is updated. And the ECC circuit 406 is caused to execute checking and outputting of the datum n+2, and the datum n+2 outputted from the ECC circuit 406 is stored into the FIFO memory 408. After that, a series of consecutive data receiving actions to have the next datum (datum n+3) transferred from the data transmitting apparatus 300 received by the data latch 404 are executed.

On the other hand, if it is found, as a result of judgment, that an error detection signal 17 for the datum n+1 has been generated, a retransmission request signal 18 is transmitted to the data transmitting apparatus 300. At the same time, the pointer of the FIFO control circuit 410 is forbidden from being updated so as to have the datum n+1 stored in the FIFO memory 408 discarded, and checking and outputting of the already received datum n+2 by the ECC circuit 406 are also forbidden so as to discard it. And the retransmit datum, sent from the data transmitting apparatus 300, is caused to undergo execution of reception, checking and outputting by the data receiving circuit 402. After that, a re-receiving action to store the retransmit datum, outputted from the data receiving circuit 402, into the FIFO memory 408 on the basis of the FIFO pointer, which is locked as stated above, is executed.

FIG. 8 is a time chart showing the actions of the data transmitting apparatus 300 and the data receiving apparatus 400 as described above.

In the data transmitting apparatus 300, after transmitting the datum n+1 for instance, the next datum n+2 is consecutively transmitted in a pipeline system without checking the reception or non-reception of a retransmission request signal for the datum n+1. On the other hand, the data receiving apparatus 400, after receiving the datum n+1, consecutively receives the datum n+2 in a pipeline system without checking the presence or absence of any error in the datum n+1. And, if a transfer error occurs for the datum n+1, the data receiving apparatus 400 transmits a retransmission request signal 18 to the data transmitting apparatus 300, and both the received datum n+1 and datum n+2 are discarded within the data receiving apparatus 400. After that, the retransmit datum (R datum n+1) is immediately transmitted from the data latch 308 of the data transmitting apparatus 300 through the data selector 310. Moreover, the next data n+2 is also immediately retransmitted following the R datum n+1.

Incidentally, as what pertains to the prior art described above, what is described in the Gazette of the Patent Laid-open No. Hei 5-61798 is known.

SUMMARY OF THE INVENTION

According to the prior art described above, the consecutive transmission of data by the data transferring apparatus 608 is merely consecutive transmission of the datum n+1 through the datum n+3. Furthermore, the transmitting apparatus is provided with a data latch for temporary storage of a datum to be retransmitted separately from the memory, and retransmission is performed only on a datum-by-datum basis. Such a configuration restricts the distance of transfer and the speed of transfer on account of the latching for temporary storage and other reasons.

Furthermore, even if the point where an error has arisen during the processing of a data transfer between processor elements is within the interconnecting network, retransmission should in any case be carried out from the transmitting processor element. Also, if this retransmission is to be executed by software in the transmitting processor, the overhead in the system will expand.

Therefore, an object of the present invention is to provide a parallel processor system and a data transmitting/receiving apparatus which makes possible data retransmission from any desired point in the system and is capable of retransmitting a variable number of data and of data retransmission with no restriction on the distance of transfer or the speed of transfer.

In order to achieve the object stated above, in a parallel processing system according to the invention, each of a plurality of processing nodes coupled to one another by at least one switching apparatus transmits data to via the switching apparatus and receives data transmitted from the switching apparatus. Also, the switching apparatus receives transfer data transmitted from one of the processing nodes or another switching apparatus, and transmits the transfer data to the destination processing node or the other switching apparatus. And if any error is detected in the data received by the processing node or the switching apparatus on the receiving side, a request for retransmission of the transfer data is given to the processing node or the switching circuit on the transmitting side, and the processing node or the switching circuit on the transmitting side retransmits the transfer data in response to the retransmission request.

Further in the parallel processor system according to the invention, each of the processing nodes and switching apparatus(es) is provided with a data transmitting/receiving apparatus, and each of the data transmitting/receiving apparatuses is provided with a transfer data buffer for temporarily holding a plurality of data to be transmitted or received, a transmission/reception control means for controlling the transmission/reception of data and the reading of transmit data from and the writing of receive data into the transfer data buffer, an error detecting means for detecting the presence or absence of any error in receive data, and a retransmission control means for issuing, when said error detecting means has detected any error, a retransmission request to the processing node or switching circuit on the transmitting side, and instructing, when it has received a retransmission request issued from the processing node or switching apparatus on the receiving side, said transmission/reception control means to retransmit the data. And the transmission/reception control means, in response to the instruction to retransmit, reads again retransmits the already transmitted data held by the transfer data buffer.

Further, the transfer data buffer is provided with a plurality of data holding areas, and holds data to be transmitted or received in the data holding areas consecutive in the sequence of transmission or in the sequence of reception; and the transmission/reception control means is provided with a buffer control means for controlling a pointer for indicating each data holding area in the transfer data buffer. And the buffer control means, in response to the instruction to retransmit, subtracts a predetermined subtrahend from the pointer at that point of time, successively reads a plurality of already transmitted data equivalent to the subtrahend, held in areas following the data holding area indicated by the subtracted pointer, and the transmission/reception control means successively retransmits the already transmitted data that are read.

As configuration in this manner makes possible processing of retransmission from the processing node or switching circuit on the transmitting side even if a transfer error occurs during a data transfer between a processing node and a switching apparatus, there is no need for the processing node on the transmitting side to perform retransmission processing on every occasion, and the overhead on the retransmission processing by processing nodes can be substantially reduced.

Furthermore, because the number of data to be retransmitted can be made variable, data retransmission can be carried out with no restriction on the speed of transfer and the distance of transfer between apparatuses.

DESCRIPTION OF THE PREFERRED EMBODIMENTS

An embodiment of the present invention will be described more specifically below with reference to FIG. 1 to FIG. 6.

Figure 5:
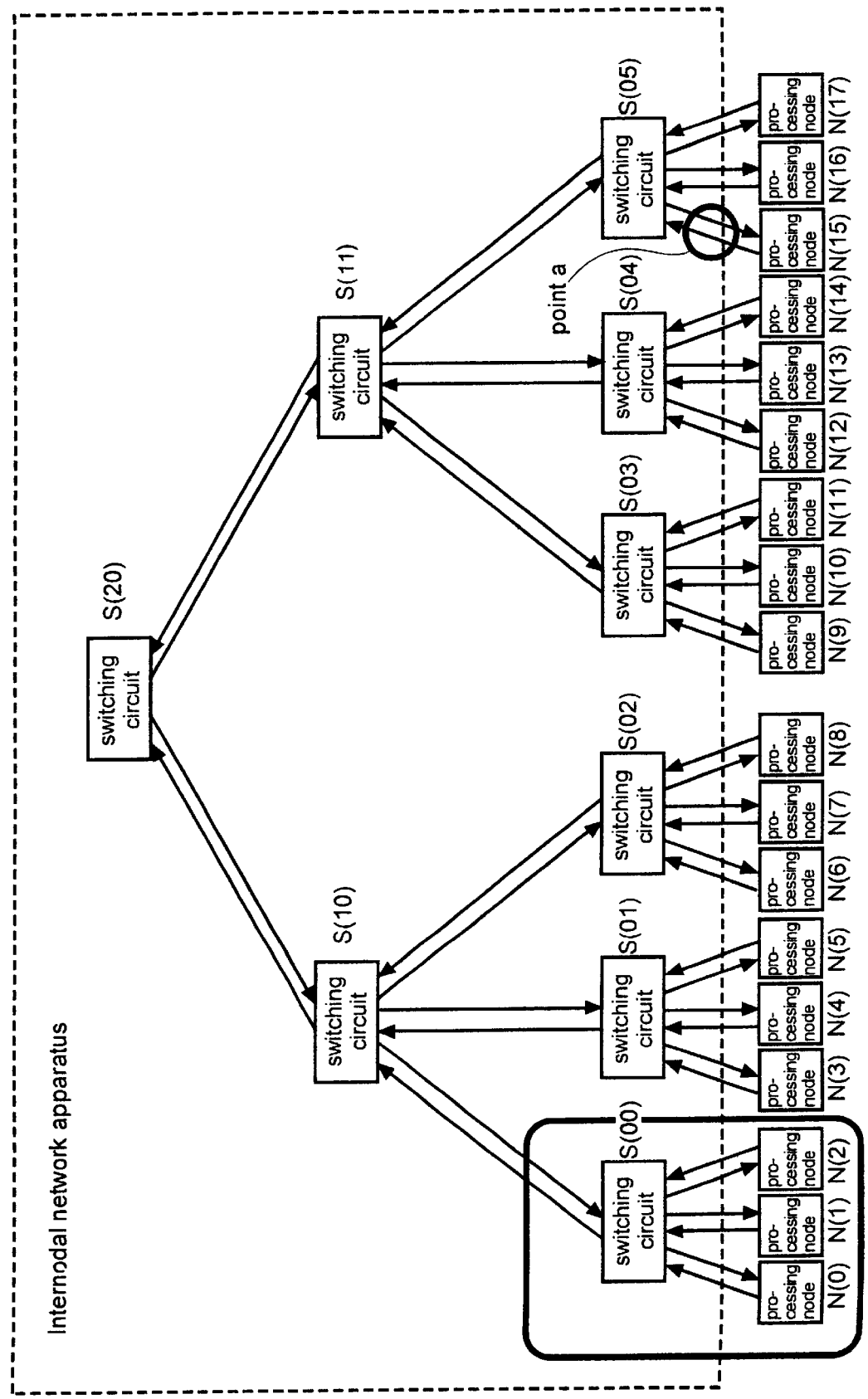
FIG. 5 is a configurational diagram of a parallel processor system according to the embodiment of the invention.

FIG. 5 shows a configurational diagram of a parallel processor system in this embodiment.

In FIG. 5, each of N(0) to N(17) is a processing node. And each of S(00) to S(20) is a switching circuit interconnecting the processing nodes. Here the switching circuits S(00) to S(02) are connected to the switching circuit S(10); the switching circuits S(03) to S(05) are connected to the switching circuit S(11), and the switching circuit S(10) and S(11) are connected to the switching circuit S(20), thereby constituting an internodal network apparatus.

Further, of the switching circuits, S(00) to S(05) here are connected to three processing nodes each.

The parallel processor system is configured by interconnecting the processing nodes N(0) to N(17) in this manner via the switching circuits S(00) to S(20) connected in multiple stages. And the nods N(0) to N(17) transfer data between one another via the switching circuits S(00) to S(20).

Incidentally, the number of processing nodes N, that of switching circuits S, that of processing nodes N connected to switching circuits S and the like in the foregoing configuration are mere examples.

Figure 6:
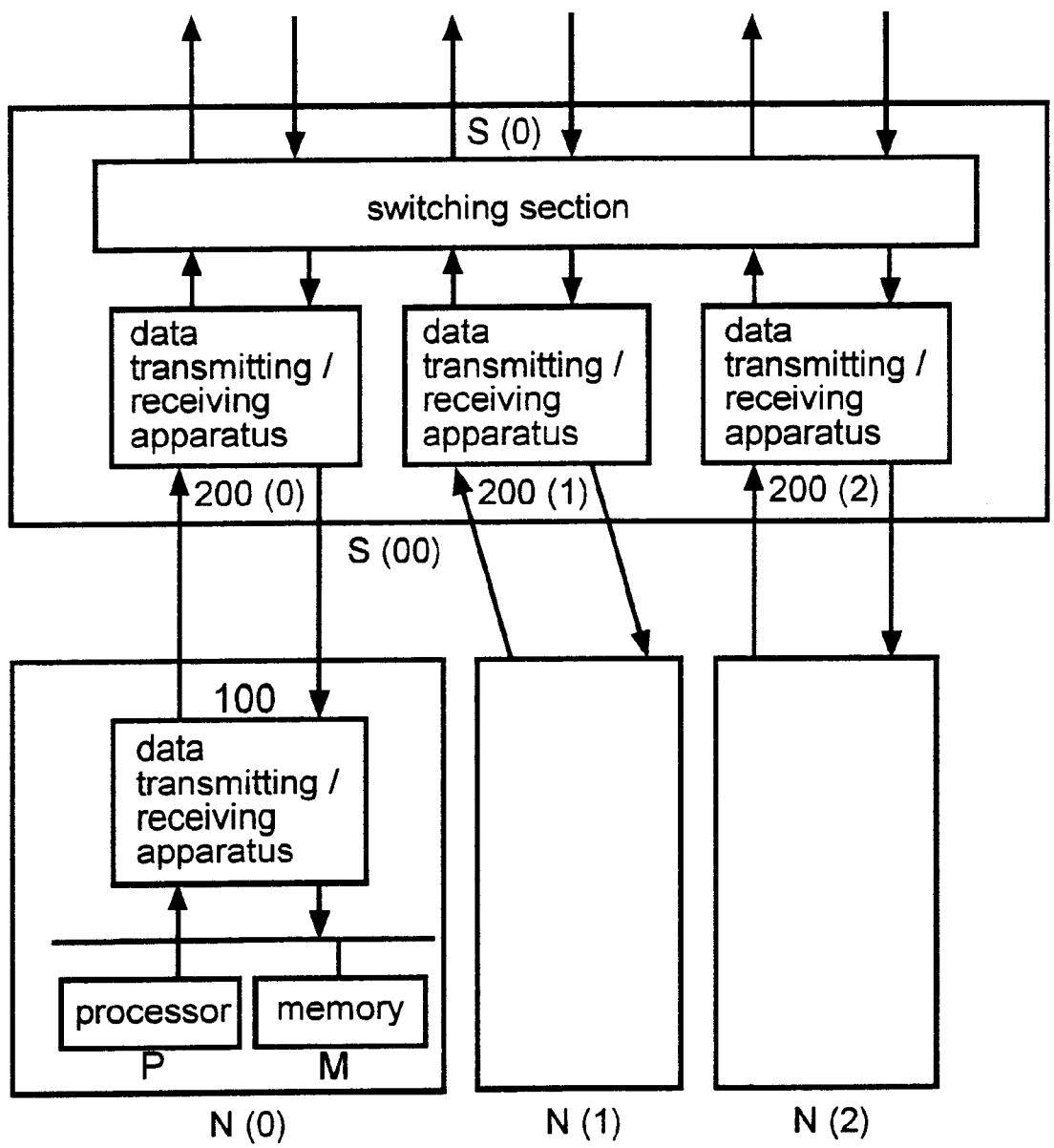
FIG. 6 is a detailed configurational diagram of processing nodes and switching circuits according to the embodiment of the invention.
Figure 7:
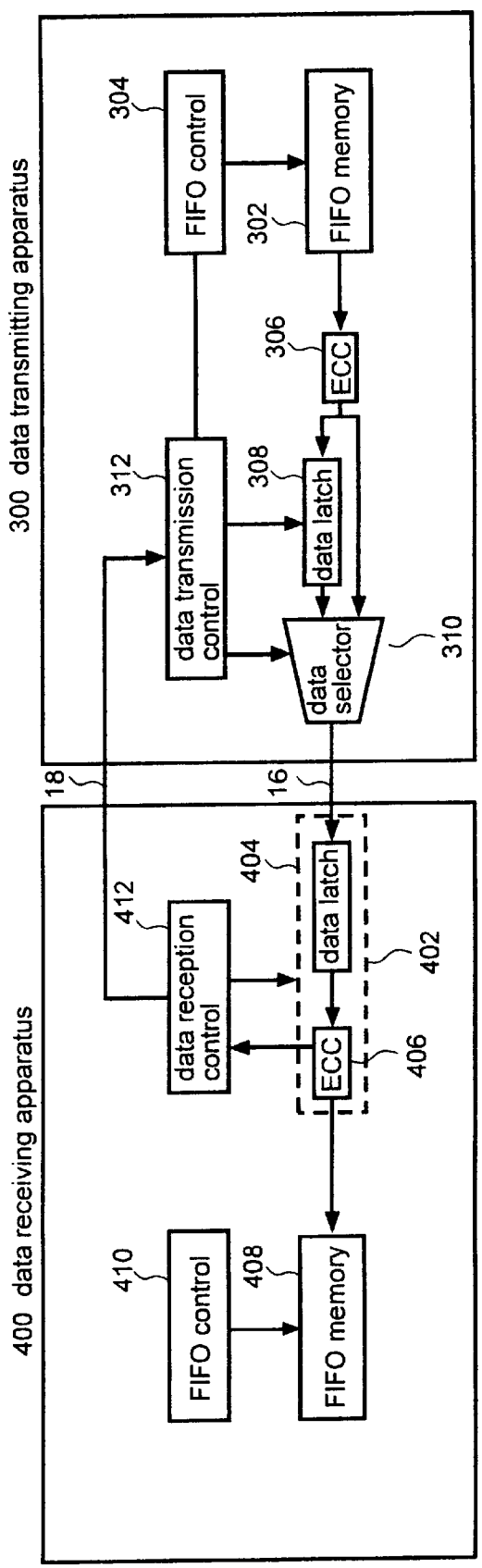
FIG. 7 is a block diagram of data transmitting/receiving apparatuses according to the prior art.
Figure 8:
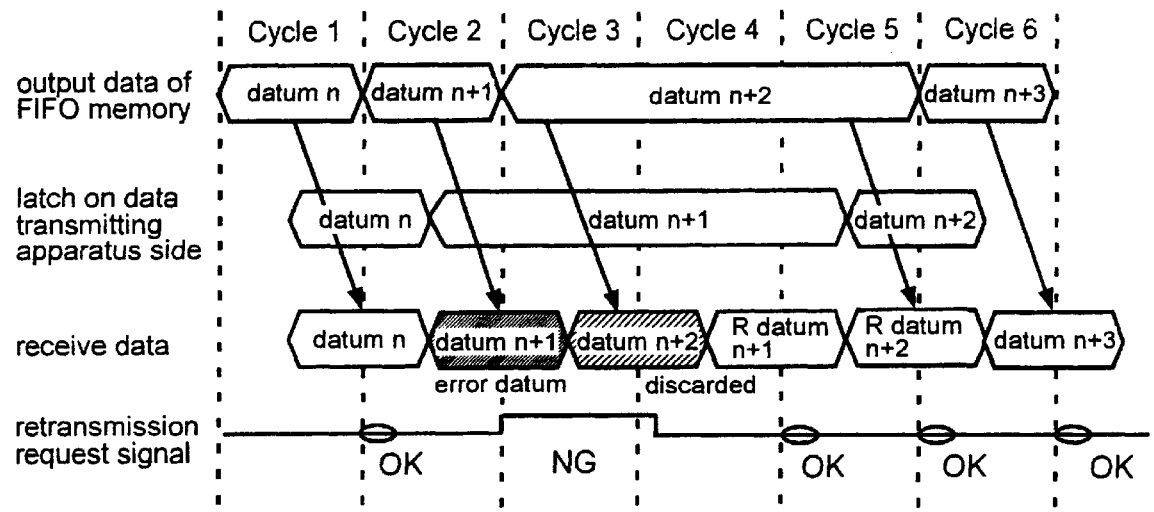
FIG. 8 is a time chart showing the transmitting/receiving actions of the data transmitting/receiving apparatuses according to the prior art.
Figure 9:
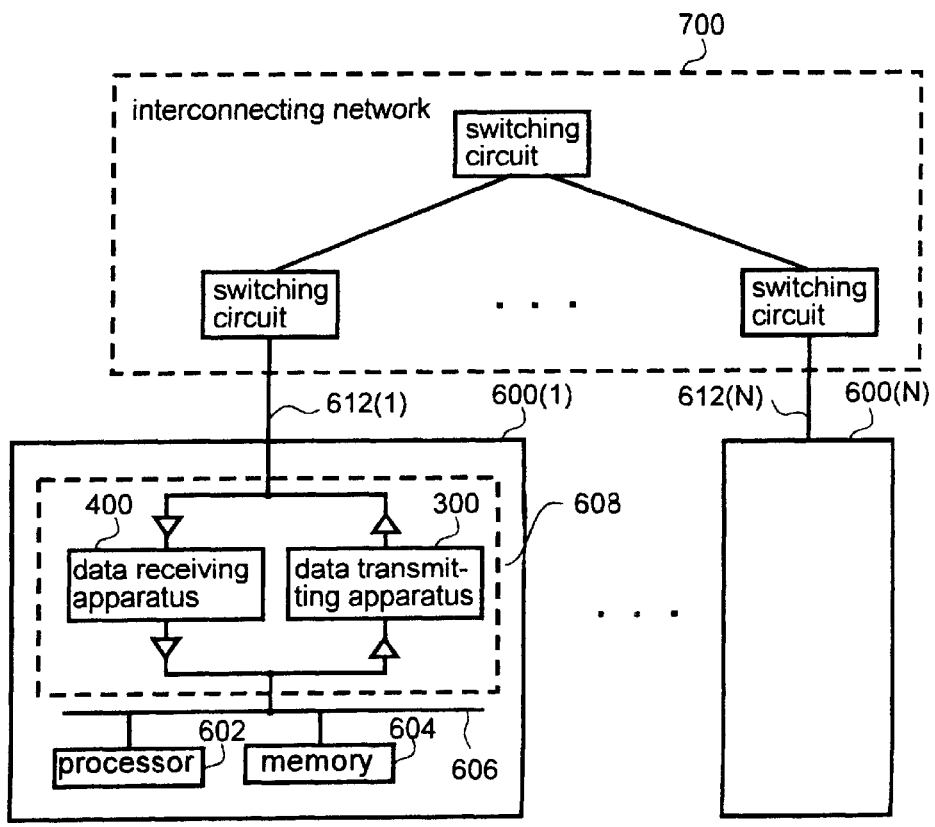
FIG. 9 is a block diagram of the multi-processor system according to the prior art.

In FIG. 6 is shown a detailed configurational diagram of the processing nodes N(0) to N(2) and the switching circuit S(00) surrounded by a bold line in FIG. 5.

In FIG. 6, the processing node N(0) consists of a processor P, a memory M and a data transmitting/receiving apparatus 100, together with an internal bus connecting them and the like. The processing node N(0), at the instruction of the processor P, transfers data stored in the memory M via the to the data transmitting/receiving apparatus 100 to the switching circuit S(00) connected to it, and receives data transferred from the switching circuit S(00) with the data transmitting/receiving apparatus 100 and stores them into the memory M. All other processing nodes N(1) to N(17) have the same configuration.

On the other hand, the switching circuit S(00) consists of data transmitting/receiving apparatuses 200(0) to 200(2) respectively provided to match the connected processing nodes, a switching section S(0) for selectively connecting the processing nodes and the switching circuit S(10) of the next stage, and the like. The switching circuit S(00) receives data transferred from any of the connected processing nodes N(0) to N(2) with the corresponding data transmitting/receiving apparatus 200 and, by having the switching section S(0)connect that data transmitting/receiving apparatus 200 to the switching circuit S(10) of the next stage, transfers the receive data from the data transmitting/receiving apparatus 200 to the switching circuit S(10). It also receives data transferred from the switching circuit S(10) with the data transmitting/receiving apparatus 200 matching one of the processing nodes N(0) to N(2) to which the data are to be transferred via the switching section S(0), and transfers the receive data from the data transmitting/receiving apparatus 200 to the matching one of the nodes N(0) to N(2). Other switching circuits S(01) to S(20) have the same configuration.

Figure 1:
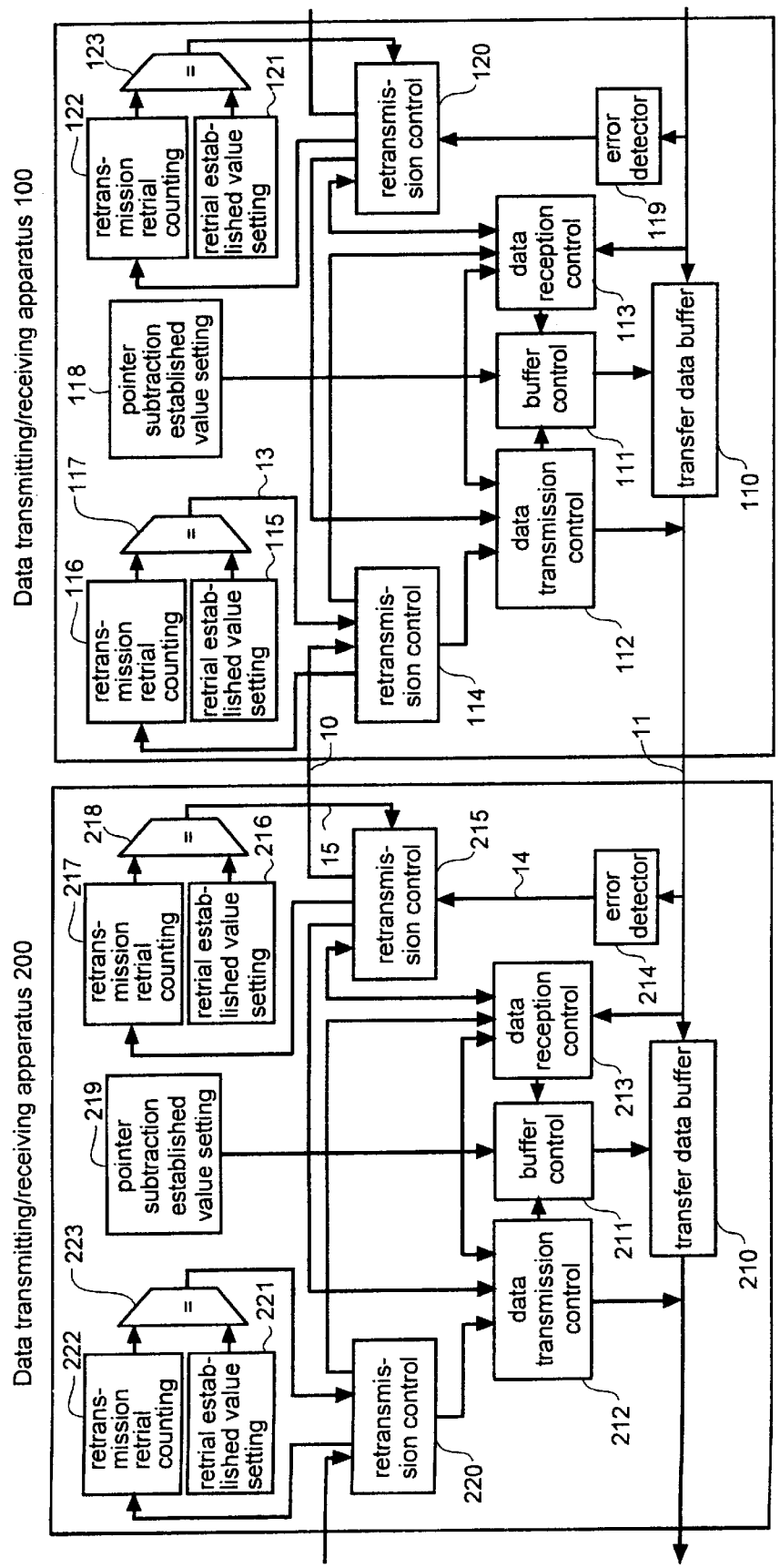
FIG. 1 is a block diagram of the configuration of data transmitting/receiving apparatuses according to one embodiment of the present invention.

FIG. 1 shows a detailed configurational diagram of the data transmitting/receiving apparatus 100 and the data transmitting/receiving apparatus 200 each of the processing nodes (0) to N(17) and of the switching circuits S(00) to S(20) is respectively provided with in this embodiment.

The data transmitting/receiving apparatus 100 and the data transmitting/receiving apparatus 200, having the same configuration, are intended for the execution of data transmission and reception. Here, however, with a view to simplifying the description, the data transmitting/receiving apparatus 100 is supposed to be on the transmitting side, and the data transmitting/receiving apparatus 200 on the receiving side, and the configuration and actions of each will be described.

In FIG. 1, the data transmitting/receiving apparatus 100 is provided with a transfer data buffer 110, a buffer control circuit 111, a data transmission control circuit 112, a data reception control circuit 113, a retransmission control circuit 114, a retrial established value setting circuit 115, a retransmission retrial counting circuit 116, a comparing circuit 117 and a pointer subtraction established value setting circuit 118 as constituting a configuration necessary for the processing of data transmission.

Of these, the transfer data buffer 110 is a buffer, having as many areas as are sufficient for holding a certain fixed number of data, for temporarily storing data to be transmitted to the data transmitting/receiving apparatus of the next stage and data received from the data transmitting/receiving apparatus of the preceding stage. This transfer data buffer 110 holds data to be transmitted or data received in areas consecutive in the sequence of transmission or in the sequence of reception in a FIFO form for instance, and each of the areas for holding data is indicated by a write pointer or a read pointer. The buffer control circuit 111 is a circuit for controlling the write and read pointers to the transfer data buffer 110; reading data out of or writing data into the transfer data buffer 110 according to that pointer; and at the time of retransmission, subtracting from the pointer using a single frame equivalent of the established subtrahend set in the pointer subtraction established value setting circuit 118, and reading the data to be retransmitted according to that pointer. The data transmission control circuit 112 is a circuit for controlling the transmission of transfer data, instructing the buffer control circuit 111 to read the transfer data from the transfer data buffer 110; and, at the time of transmitting the retransmit data, instructing the buffer control circuit 111 to subtract from the write pointer and instructing the retransmit data to be read out of the transfer data buffer 110 according to the pointer having undergone subtraction. The data reception control circuit 113 is a circuit for controlling the reception of transfer data, and instructing the buffer control circuit 111 to write the transfer data into the transfer data buffer 110. The retransmission control circuit 114 is a circuit for instructing, when a retransmission request signal 10 has been received, the data transmission control circuit 112 to interrupt the transmission of transfer data and to retransmit the data in which any error has been detected. The retrial established value setting circuit 115 is a circuit in which the established value of the maximum number of retransmission retrials in response to error detection at the time of retransmission is set, and the established retrial value can be set as desired. The retransmission retrial counting 116 is a circuit for counting the number of retransmission retrials at the time of retransmitting the same data. The comparing circuit 117 is a circuit for comparing the values of the retrial established value setting circuit 115 and the retransmission retrial counting 116, and issuing, if the two values are identical, an identity signal 13 to the retransmission control circuit 114. The pointer subtraction established value setting circuit 118 is a circuit in which a single frame equivalent of the established subtrahend for use, at the time of retransmission, by the buffer control circuit 111 to subtract from the pointer in order to read out of the transfer data buffer 110 the data to be retransmitted. A single frame in this context means the number of data to be retransmitted in one round of data retransmission, and the established subtrahend can be set as desired according to the speed of transfer and the distance of transfer between transmitting/receiving apparatuses. However, the number of data in a single frame should not be greater than the number of data that can be held in the transfer data buffer 110. Further, the setting of the retrial established value and the subtraction established value in the retrial established value setting circuit 115 and the pointer subtraction established value setting circuit 118, respectively, is accomplished by a system control apparatus (not shown) positioned superior thereto.

On the other hand, in FIG. 1, the data transmitting/receiving apparatus 200 is provided with a transfer data buffer 210, a buffer control circuit 211; a data transmission control circuit 212, a data reception control circuit 213, an error detector 214, a retransmission control circuit 215, a retrial established value setting circuit 216, a retransmission retrial counting circuit 217, a comparing circuit 218 and a pointer subtraction established value setting circuit 219 as constituting a configuration necessary for the processing of data reception.

Of these, the transfer data buffer 210 is a buffer, having as many areas as are sufficient for holding a certain fixed number of data, for temporarily storing data received from the data transmitting/receiving apparatus of the preceding stage and to be transmitted to the data transmitting/receiving apparatus of the next stage. This transfer data buffer 210 holds received data in areas consecutive in the sequence of reception in a FIFO form for instance, and each of the areas for holding data is indicated by a read pointer or a write pointer. The buffer control circuit 211 is a circuit for controlling the write and read pointers to the transfer data buffer 210; writing data into or reading data out of the transfer data buffer 210 according to that pointer; and at the time of retransmission, subtracting from the pointer using a single frame equivalent of the established subtrahend set in the pointer subtraction established value setting circuit 219, and writing the data to be retransmitted according to that pointer. The data transmission control circuit 212 is a circuit for controlling the transmission of transfer data, and instructing the buffer control circuit 211 to read the transfer data from the transfer data buffer 210. The data reception control circuit 213 is a circuit for controlling the reception of transfer data, instructing the buffer control circuit 211 to write the transfer data into the transfer data buffer 210 and, at the time of receiving the retransmit data, instructing the buffer control circuit 211 to subtract from the write pointer and instructing the retransmit data to be written into the transfer data buffer 210 according to the pointer having undergone subtraction. The error detector 214 is a circuit for checking the presence or absence of any data transfer error in data 11 and, if it has detected any error, issuing an error detection signal to the retransmission control circuit 215. The retransmission control circuit 215 is a circuit for issuing, upon receipt of the error detection signal 14 from the error detector 214, a retransmission request signal to the data transmitting/receiving apparatus of the preceding stage, and instructing the data transmission control circuit 213 to receive retransmit transfer data. The retrial established value setting circuit 216 is a circuit in which the established value of the maximum number of retransmission retrials in response to error detection at the time of retransmission is set, and the established retrial value can be set as desired. The retransmission retrial counting 217 is a circuit for counting the number of retransmission retrials by detecting again any transfer error at the time of receiving retransmit data. The comparing circuit 218 is a circuit for comparing the values of the retrial established value setting circuit 216 and the retransmission retrial counting 217, and issuing, if the two values are identical, a retransmitting action suspension signal 15 to the retransmission control circuit 215.

The pointer subtraction established value setting circuit 219 is a circuit in which a single frame equivalent of the established subtrahend for use, at the time of retransmission, by the buffer control circuit 211 to subtract from the pointer in order to write into the transfer data buffer 210 the data to be retransmitted, where the established subtrahend can be set as desired according to the speed of transfer and the distance of transfer between transmitting/receiving apparatuses. However, the number of data in a single frame should not be greater than the number of data that can be held in the transfer data buffer 110. And, for the subtraction established value, a common value should be set between the apparatus on the transmitting side and that on the receiving side. Further, the setting of the retrial established value and the subtraction established value in the retrial established value setting circuit 216 and the pointer subtraction established value setting circuit 219, respectively, is accomplished by a system control apparatus (not shown) positioned superior thereto.

In addition to the above-described description, the data transmitting/receiving apparatus 100 is provided with an error detector 119, a retransmission control circuit 120, a retrial established value setting circuit 121, a retransmission retrial counting circuit 122 and a comparing circuit 123 similar to those described in regard to the data transmitting/receiving apparatus 200 as constituting a configuration necessary for the processing of data reception. Also the data transmitting/receiving apparatus 200 is provided with a retransmission control circuit 220, a retrial established value setting circuit 221, a retransmission retrial counting circuit 222 and a comparing circuit 223 similar to those described in regard to the data transmitting/receiving apparatus 100 as constituting a configuration necessary for the processing of data transmission. Thus the data transmitting/receiving apparatuses 100 and 200 have the same configuration.

Incidentally, although each of the two data transmitting/receiving apparatuses 100 and 200 is provided with separate retransmission control circuits for data transmission and data reception in this embodiment, they may have a configuration in which only one retransmission control service is provided for combined transmission and reception use.

Furthermore, although each of the two data transmitting/receiving apparatuses 100 and 200 is respectively provided with the error detector 119 or 214 and, if any error is detected, a retransmission request signal 10 is issued from the retransmission control circuit 120 or 215 in this embodiment, alternatively the configuration may be such that each processing node N or each switching circuit S be provided with an error detecting apparatus outside each data transmitting/receiving apparatus 100 or 200, and a retransmission request signal may be issued therefrom. Or, the configuration may as well be such that data transfer errors be checked and a retransmission request signal be issued by software in each processing node N.

Figure 2:
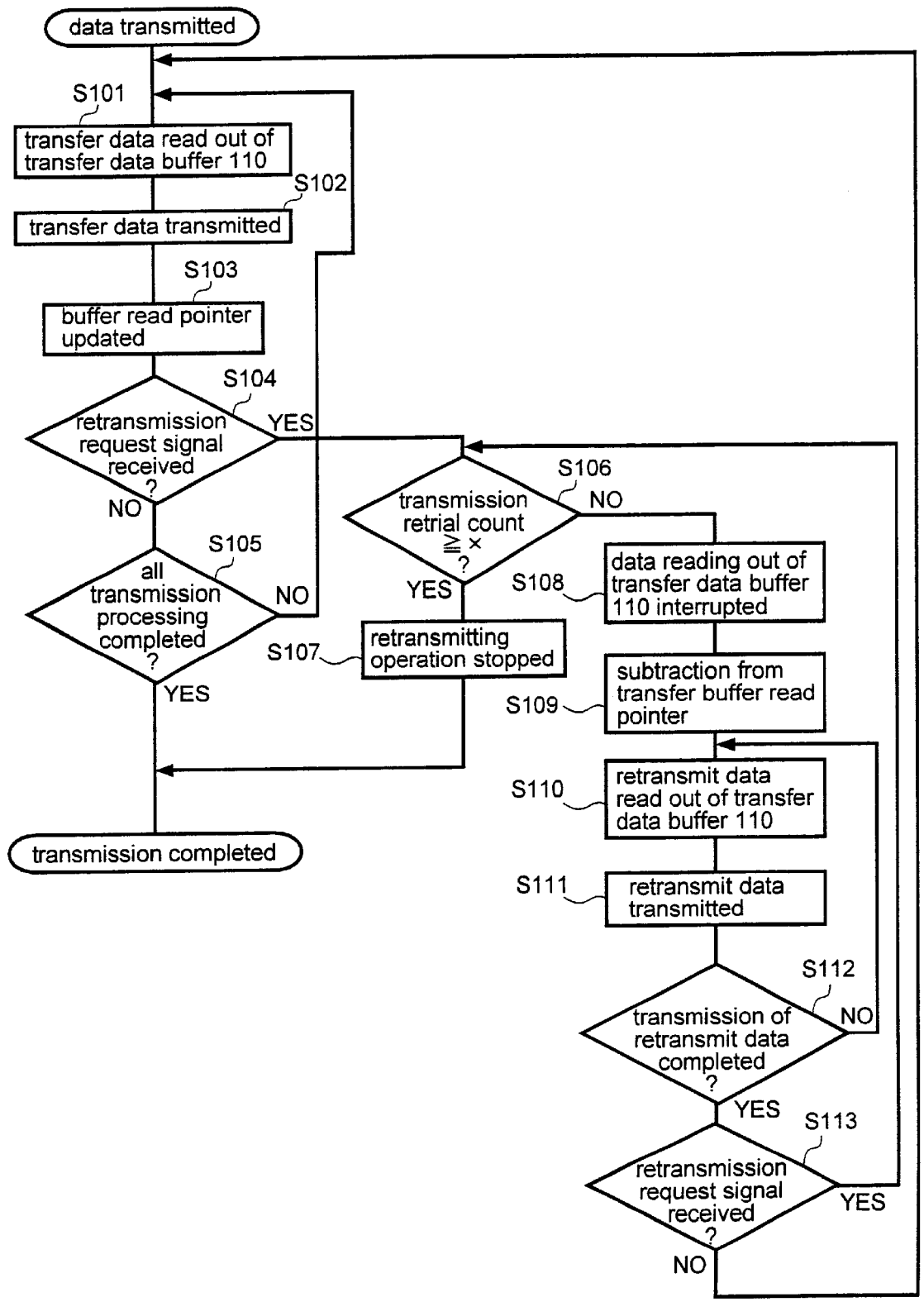
FIG. 2 is a flowchart showing the transmitting operation of data transmitting/receiving apparatus according to the embodiment of the invention.
Figure 3:
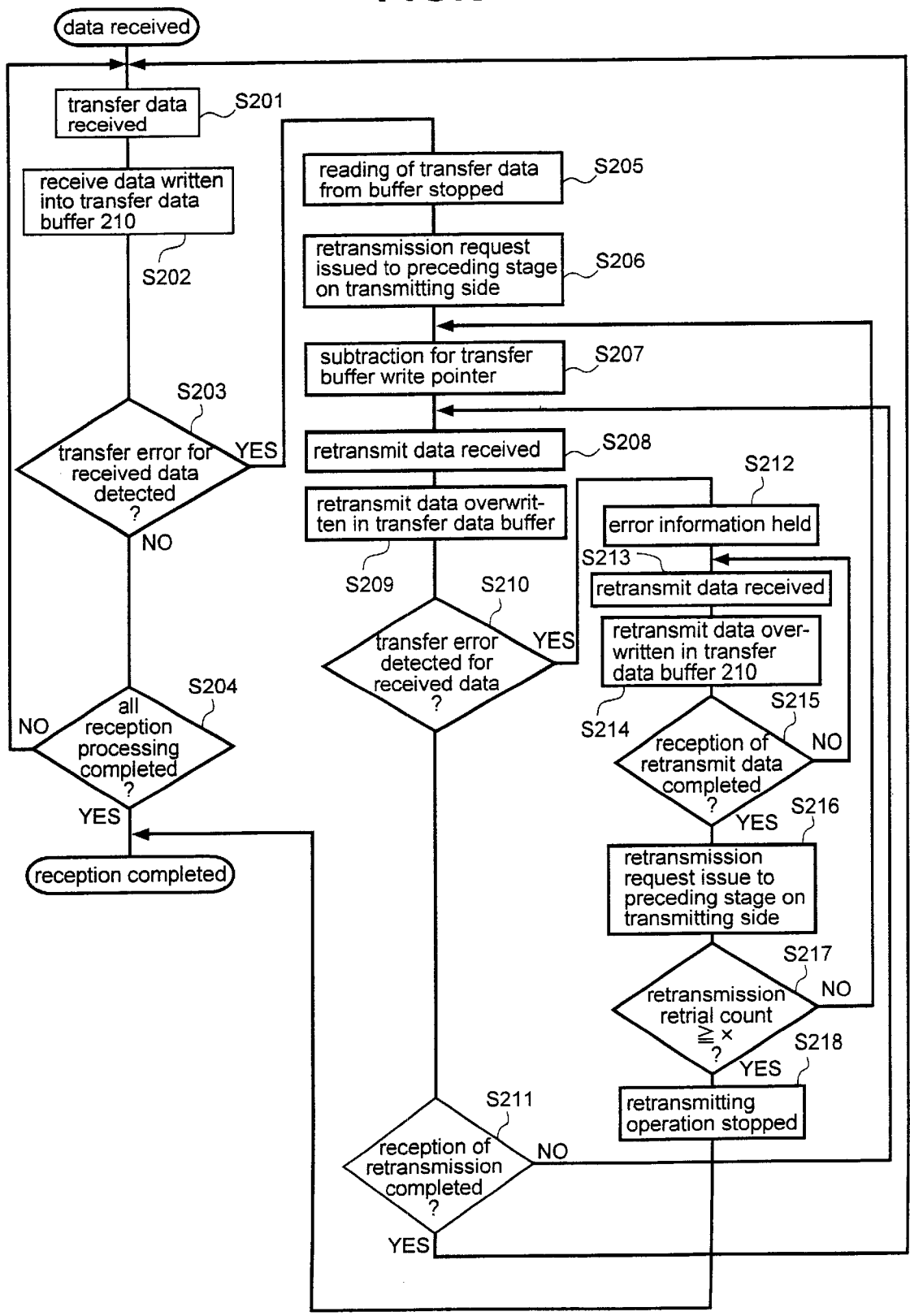
FIG. 3 is a flowchart showing the receiving operation of data transmitting/receiving apparatus according to the embodiment of the invention.
Figure 4:
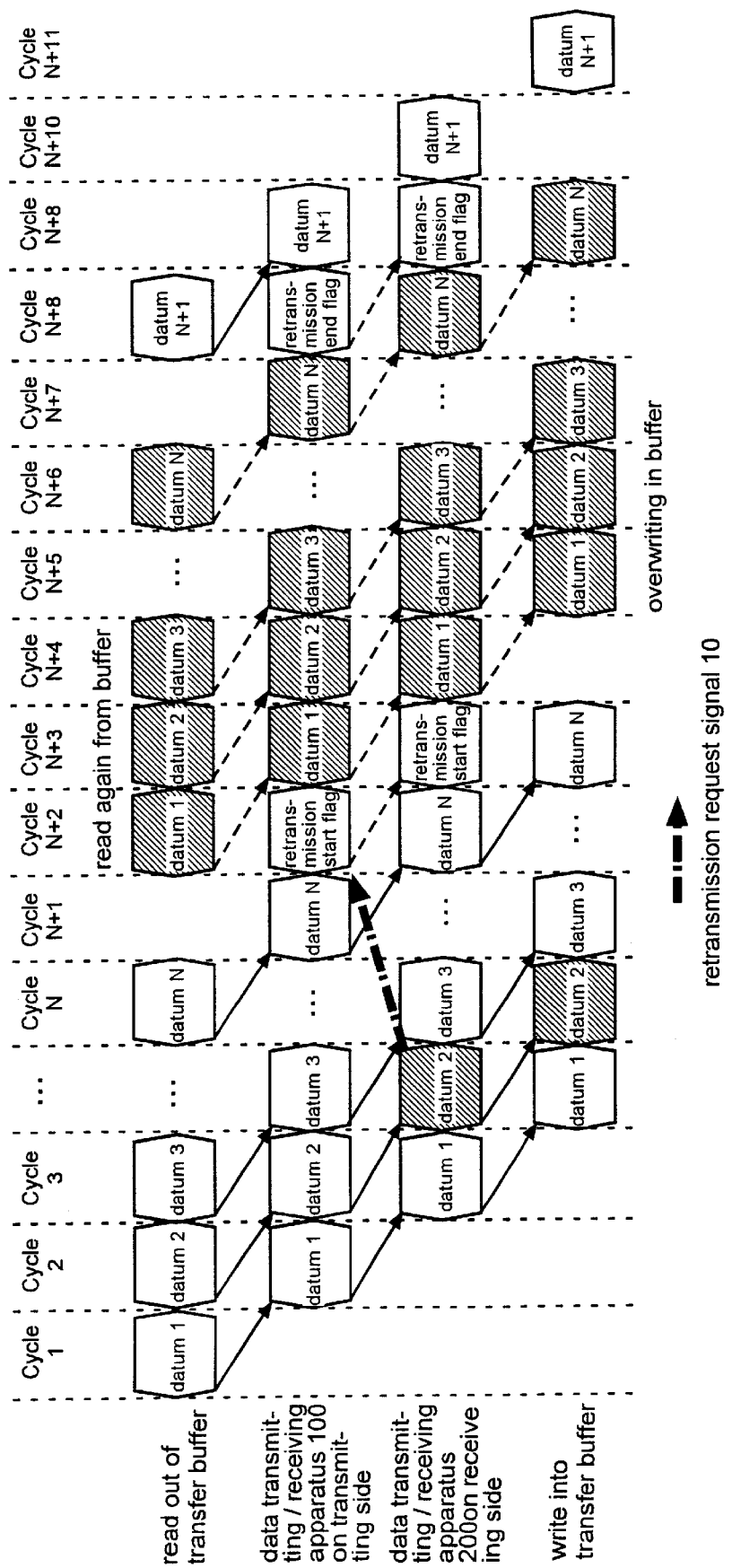
FIG. 4 is a time chart showing the transmitting/receiving actions of a data transmitting/receiving apparatus according to the embodiment of the invention.

Next, the operation of the data transmitting/receiving apparatuses 100 and 200 of this embodiment is illustrated in FIGS. 2 to 4.

To add, between the data transmitting/receiving apparatuses of this embodiment, a variable-length series of data whose transfer has been instructed by the data transfer request source (which is a processor P in one of the nodes in this embodiment) are transferred (transmitted and received) in prescribed data units (of 2 bytes or 4 bytes each for example). And by completing the transfer of all the data units constituting a series of data, the transfer of those data is completed. Therefore, in the following description, the data transmitting/receiving operation will be explained with individual data units transmitted and received in a single transfer action being referred to as transfer data or retransmit data.

FIG. 2 is a flowchart showing the transmitting action in the data transmitting/receiving apparatus 100.

In the data transmitting/receiving apparatus 100, when transmitting data, the data transmission control circuit 112 instructs the buffer control circuit 11 to read transfer data from the transfer data buffer 110, and in compliance with that the buffer control circuit 111 reads transfer data from the transfer data buffer 110 (S101). Hereupon the data control circuit 112, if the data read out of the transfer data buffer 10 are the first (data unit) of data constituting a series of data to be transferred, i.e. if the transfer of a certain series of data is to be started, adds to the read data (the first data) necessary information including information indicating the start of the transfer of a series of data (the start flag) and information indicating the destination of the data (the destination address), and transmits the data to the data transmitting/receiving apparatus of the next stage (S102). Or, in the case of any other data than the first data, only the read data are transmitted (S102). However, the configuration may as well be such that the aforementioned control information except the start flag or some other information than the aforementioned may be added to data, even if they are not the first data, and the data be transmitted. The buffer control circuit 111, upon reading transfer data out of the transfer data buffer 110, updates the read pointer indicating the area of the transfer data buffer 110 in which data to be read are held (S103).

The retransmission control circuit 114 is monitoring if a retransmission request signal 10 for the transmitted data has been received from the data transmitting/receiving apparatus of the next stage (S104). If no retransmission request signal 10 has been received from the data transmitting/receiving apparatus of the next stage, the retransmission control circuit 114 gives the data transmission control circuit 112, for instance, a Low level signal indicating the absence of a retransmission request.

The data transmission control circuit 112, having transmitted data, perceives the receipt of a Low level signal from the retransmission control circuit 114, checks whether or not the transmission processing for all the transfer data constituting the series of data to be transferred (S105) has been completed and, if not, repeats the actions of S101 to S105 until it is completed. Upon completion of the transmission of the whole transfer data, the data transmission control circuit 112 transmits as one datum information indicating the completion of the transfer of the series of data (the end flag) to the data transmitting/receiving apparatus of the next stage, completes the transmitting action for that series of data, and goes on to start the transfer of a new series of data. If there is no new series of data to be transferred consecutively, it will wait until it is instructed by a data transfer request source to transfer such data.

On the other hand, if the retransmission control circuit 114 judges that a retransmission request signal 10 has been received, the retransmission control circuit 114 transmits to the retransmission retrial counting circuit 116, for instance, a High level signal indicating the receipt of a retransmission request signal 10. The retransmission retrial counting circuit 116, indicating a count "0" in the normal state, counts up the number of retransmission trials when it receives a High level signal from the retransmission control circuit 114. This counted up number of retransmission retrials is compared by the comparing circuit 117 with the established value of the maximum number of retransmission retrials set in the retrial established value setting circuit 115 (S106). If the two numbers are identical or the counted up number of retransmission retrials is not greater than the established value of the maximum number of retransmission retrials, for instance a Low level signal 13 is given from the comparing circuit 117 to the retransmission control circuit 114.

The retransmission control circuit 114 perceives the receipt of the Low level signal 13 from the comparing circuit 117, and transmits a High level signal to request the data transmission control circuit 112 to interrupt the data transmitting action and retransmit the data. The data transmission control circuit 112 perceives the receipt of the High level signal from the retransmission control circuit 114, and instructs the buffer control circuit 111 to interrupt the reading of transfer data from the transfer data buffer 110. The buffer control circuit 111 interrupts the reading of transfer data from the transfer data buffer 110 (S108).

Next, the data transfer control circuit 112 instructs the buffer control circuit 111 to subtract from the buffer read pointer. The buffer control circuit 111 subtracts from the buffer read pointer value at that point of time a single frame equivalent of the established subtrahend set in the pointer subtraction established value setting circuit 118 (S109). After that, the data transmission control circuit 112 instructs the buffer control circuit 111 to start reading retransmit data from the transfer data buffer 110. The buffer control circuit 111, using the pointer value having undergone subtraction, reads the retransmit data out of the transfer data buffer 110 (S110). The buffer control circuit 111, having read the retransmit data out of the transfer data buffer 110, updates the read pointer. The data transfer control circuit 112 transmits as one datum information a retransmission start flag indicating the start of data retransmission to the data transmitting/receiving apparatus of the next stage. And it transmits the retransmit data that have been read (S111). The transfer control circuit 112, having transmitted data, checks whether or not a single frame equivalent of retransmit data which are to be retransmitted has been wholly transmitted (S112), and repeats the actions of S110 to S112 until all is transmitted. The data transmission control circuit 112 transmits as one datum information a retransmission end flag indicating the end of data retransmission to the data transmitting/receiving apparatus of the next stage, and thereby completes the retransmission of data.

During this retransmitting action, too, the retransmission control circuit 114 is monitoring the presence or absence of receipt of a retransmission request signal 10 for the retransmit data (S113). If no retransmission request signal 10 has been received, a Low level signal is given from the retransmission control circuit 114 to the data transmission control circuit 112.

The data transmission control circuit 112, if it perceives the receipt of a Low level signal from the retransmission control circuit 114 after the completion of data retransmission, returns to normal operation, and resumes the actions from S101 on.

However, if the retransmission control circuit 114 has judged that a retransmission request signal 10 has been received again, the retransmission control circuit 114 issues to the retransmission retrial counting circuit 116 a High level signal to the effect the retransmission request signal has been received. The retransmission retrial counting circuit 116, receiving the High level signal from the retransmission control circuit 114, counts up the number of retransmission retrials. This counted up number of retransmission retrials is compared by the comparing circuit 117 with the established value of the maximum number of retransmission retrials set in the retrial established value setting circuit 115 (S106). If the two numbers are identical or the counted up number of retransmission retrials is greater than the maximum number of retransmission retrials, for instance a Low level signal 13 is given to the retransmission control circuit 114. The retransmission control circuit 114 perceives the receipt of the Low level signal 13 from the comparing circuit 117, and transmits a High level signal to request the data transmission control circuit 112 to retransmit the data.

The data transmission control circuit 112 perceives the receipt of the Low level signal from the retransmission control circuit 114 after the completion of data retransmission, and repeats the above-described actions of S108 to S113. In this case, however, as the actions from S108 onward are performed after retransmission has been completed already, no data reading out of the transfer data buffer 110 takes place at that point of time. Therefore, the action of S108 is not performed, but in substance the actions from S109 onward are carried out. And either the data retransmitting operation is ended without receiving a High level signal from the retransmission control circuit 114, or the foregoing retransmitting actions are repeated until a signal instructing the stop of the retransmitting actions is received from the retransmission control circuit 114 in response to the result of comparison by the comparing circuit 117 indicating identity between the value of the retransmission retrial counting circuit 116 and that of the retrial established value setting circuit 115.

On the other hand, if the value of the retransmission retrial circuit counting 116 and that of the retrial established value setting circuit 115 are found identical as a result of comparison by the comparing circuit 117 (S106), a High level signal 13 is issued from the comparing circuit 117 to the retransmission control circuit 114. The retransmission control circuit 114, upon perceiving the receipt of this High level signal 13, issues a signal to instruct the stop of retransmitting actions to the data transmission control circuit 112. Also, the retransmission control circuit 114 determines the failure which has given rise to the retransmission as a fixed failure, and notifies a system control apparatus not shown of the occurrence of the fixed failure. The data transmission control circuit 112, perceiving the receipt of the signal to instruct the stop of retransmitting actions, stops the retransmitting actions, and completes transmitting actions.

FIG. 3 is a flowchart showing the transmitting action in the data transmitting/receiving apparatus 200.

The data transmitting/receiving apparatus 200 consecutive receives data 11 transferred from the data transmitting/receiving apparatus of the preceding stage. Hereupon the data control circuit 213, if the reception of a certain series of data is to be started, i.e. if the data 11 which have been transferred are the first (data unit) of data constituting the series of data, detects the control information added to the data, including information indicating the start of the transfer (the start flag) and information indicating the destination of the data (the destination address), and starts receiving that series of data (S201). And it instructs the buffer control circuit 211 to write the data 11 into the transfer data buffer 210. In compliance with the instruction, the buffer control circuit 211 writes the data 11 into the transfer data buffer 210 (S202). After that, the write pointer indicating the area of the transfer data buffer 210 in which the transfer data are to be written is updated.

The error detector 214, every time it receives data 11, judges whether or not any transfer error has been detected for the receive data 11 (S203). If it is found that no error has been detected as a result of judgment, an error detection signal given from the error detector 214 to the retransmission control signal 215 indicates the detection of no error by, for instance, remaining at a Low level.

The retransmission control circuit 215 is monitoring the error detection signal from the error detector 214 and, as long as the error detection signal is at a Low level, a Low level signal, for instance, indicating non-detection of any error is given from the retransmission control circuit 215 to the data reception control circuit 213.

The data reception control circuit 213, perceiving the receipt of a Low level signal from the retransmission control circuit 215, checks whether or not it has detected information indicating the completion of the transfer of a series of data (the end flag), i.e. the reception of all the transfer data constituting the series of data to be transferred has been completed (S204). If the reception processing has not been completed, the actions of S201 to S204 are repeated until it is completed. Upon detection of the end flag by the data reception control circuit 213 without detecting any transfer error, the completion of the reception of all the transfer data is perceived, and the operation to receive that series of data is ended. After that, if there is another series of data newly transferred, the reception of those data is started. If there is no new series of data to be received consecutively, the circuit will stand by until such data are transferred.

On the other hand, if the error detector 214 detects a transfer error for the receive data 11 (S203), it issues an error detection signal 14 of a High level, indicating error detection, to the retransmission control circuit 215. The retransmission control circuit 215, upon receipt of the error detection signal 14 of a High level, issues a signal to instruct the data transmission control circuit 212 to interrupt the transmission of the data being transferred. The data transmission control circuit 212, in response to the instruction signal from the retransmission control circuit 215, instructs the buffer control circuit 211 to instruction the processing to read transfer data from the transfer data buffer 210. The buffer control circuit 211 stops reading transfer data from the transfer data buffer 210 (S205). Next, the retransmission control circuit 215 issues a retransmission request signal 10 to the data transmitting/receiving apparatus of the preceding stage (S206). It also issues a High level signal indicating the detection of a transfer error to the data reception control circuit 213. The data reception control circuit 213, though perceiving the receipt of the High level signal from the retransmission control circuit 215, instructs the buffer control circuit 211 to continue to write data, transferred from the data transmitting/receiving apparatus of the preceding stage, until a retransmission start flag indicating the start of data retransmission is detected. And the buffer control circuit 211 writes those data into the transfer data buffer 210. After that the data reception control circuit 213, upon detection of a retransmission start flag, instructs the buffer control circuit 211 to subtract from the buffer write pointer. The buffer control circuit 211 subtracts from the buffer write pointer value at that point of time a single frame equivalent of the established subtrahend set in the pointer subtraction established value setting circuit 219 (S207).

The data reception control circuit 213 starts receiving the retransmit data (S208), and instructs the buffer control circuit 211 to write the retransmit data that have been received into the transfer data buffer 210. In accordance with that instruction, the buffer control circuit 211, using the pointer value having undergone subtraction, writes the retransmit data over the same data already written into the transfer data buffer 210 (S209). And it updates the write pointer.

The error detector 214, every time it receives retransmit data, judges whether or not any transfer error has been detected for the retransmit data (S210). If it detects no transfer error, the error detection signal given from the error detector 214 to the retransmission control signal 215 remains at a Low level. A Low level signal is also given from the retransmission control circuit 215 to the data reception control circuit 213.

The data reception control circuit 213, perceiving the receipt of a Low level signal from the retransmission control circuit 215, checks whether or not it has detected a retransmission end flag indicating the end of data retransmission, i.e. whether or not the reception of a single frame equivalent of retransmit data to be received has been completed (S211). If it has not, it repeats the actions of S208 to S211 until it is completed. Upon detection of the retransmission end flag by the data reception control circuit 213 without the detection of any transfer error by the error detector 214, the completion of the detection of a single frame equivalent of retransmit data is perceived (S211), and normal operation is restored to resume the actions from S201 on.

However, if the error detector 214 has detected a transfer error for the retransmit data (S209), a High level error detection signal 14 is issued to the retransmission control circuit 215. The retransmission control circuit 215, upon receipt of the High level error detection signal 14, holds the error detection information as it is (S212). The data reception control circuit 213 receives retransmit data transferred from the data transmitting/receiving apparatus of the preceding stage until a retransmission end flag indicating the end of data retransmission is detected (S213), and instructs the buffer control circuit 211 to write data into the transfer data buffer 210. The buffer control circuit 211, using the pointer value having undergone subtraction, writes the retransmit data over the same data already written into the transfer data buffer 210 (S214). And the data reception control circuit 213 checks whether or not the retransmission end flag has been detected (S215), and repeats the actions of S213 to S215 until the reception of retransmit data is completed.

Upon completion of the reception of retransmit data, a signal notifying the completion of reception is issued from the data reception control circuit 213 to the retransmission control circuit 215. Upon receiving the signal from the data reception control circuit 213, the retransmission control circuit 215 retransmits a retransmission request signal 10 to the data transmitting/receiving apparatus of the preceding stage (S216). In connection with the retransmission of the retransmission request signal 10, a High level signal indicating the detection of a transfer error for the retransmit data is issued from the retransmission control circuit 215 to the retransmission retrial counting circuit 217. The retransmission retrial counting circuit 217, indicating a count "0" in the normal state, counts up the number of retransmission trials when it receives a High level signal from the retransmission control circuit 215. This counted up number of retransmission retrials is compared by the comparing circuit 218 with the established value of the maximum number of retransmission retrials set in the retrial established value setting circuit 216 (S217). If the two numbers are identical or the counted up number of retransmission retrials is not greater than the established value of the maximum number of retransmission retrials, for instance a Low level signal 15 indicating non-identity is given from the comparing circuit 218 to the retransmission control circuit 215.

The retransmission control circuit 215, perceiving the receipt of a Low level signal 15 from the comparing circuit 218, issues to the data reception control circuit 213 a High level signal indicating the detection of any transfer error for retransmit data. The data reception control circuit 213 perceives the receipt of the High level signal from the retransmission control circuit 215. And the data reception control circuit 213, if it later detects a retransmission start flag, carries out the above-described retransmit data receiving actions, i.e. the actions of S207 to S211 and, if a transfer error has occurred for the retransmit data, performs the actions of S213 to S215. And it either ends the receiving actions without detecting any error for the retransmit data, or repeats the retransmit data receiving actions until a signal instructing the stop of the receiving actions is received from the retransmission control circuit 215 in response to the result of comparison by the comparing circuit 218 indicating identity between the value of the retransmission retrial counting circuit 217 and that of the retrial established value setting circuit 216.

On the other hand, if the value of the retransmission retrial circuit counting 217 and that of the retrial established value setting circuit 216 are found identical as a result of comparison by the comparing circuit 218 (S217), a High level signal 15 is issued from the comparing circuit 218 to the retransmission control circuit 215. The retransmission control circuit 215, upon perceiving the receipt of this High level signal 15, issues a signal to instruct the stop of receiving actions to the data transmission control circuit 213. Also, the retransmission control circuit 215 determines the failure which has given rise to the retransmission as a fixed failure, and notifies a system control apparatus not shown of the occurrence of the fixed failure. The data reception control circuit 213, perceiving the receipt of the signal to instruct the stop of receiving actions, performs no further receiving actions, and completes receiving actions.

FIG. 4 is a time chart showing the actions of the data transmitting/receiving apparatus 100 on the transmitting side and the data transmitting/receiving apparatus 200 on the receiving side as described above.

The data transmitting/receiving apparatus 100 reads a plurality of data (datum 1, datum 2, datum 3, . . . , datum N, datum N+1, . . . ), constituting a series of data whose transfer has been instructed from a data transfer requesting source, out of the transfer data buffer 110 in accordance with the above-described transmitting procedure, and consecutively transmits them to the data transmitting/receiving apparatus 200, which is the destination of transfer. On this occasion, as shown in FIG. 4, the data transmitting/receiving apparatus 100, having read out of the transfer data buffer 110 and transmitted each datum (e.g. datum 1), consecutively reads datum 2, datum 3, following datum 1 out of the transfer data buffer 110 without waiting for the reception of the result of transfer error detection by the data transmitting/receiving apparatus 200 of the next stage for that datum 1, i.e. a retransmission request signal 10 that will be issued from the data transmitting/receiving apparatus 200 of the next stage if any transfer error is detected, and transmits them cycle by cycle.

On the other hand, the data transmitting/receiving apparatus 200 receives cycle by cycle the data transferred consecutively. On this occasion, while it attempts to detect any transfer error with the error detector 214 every time a datum is received, it writes the receive data into the transfer data buffer 210 without waiting for the result of this error detection. Therefore, as shown in FIG. 4, if for example datum 1 is received, it writes datum 1 into the transfer data buffer 210 without waiting for the result of transfer error detection for datum 1, and receives the following datum 2, datum 3, . . . , and writes them into the transfer data buffer 210.

If, in the course of such receiving operation, a transfer error is detected for datum 2, for instance, a retransmission request signal 10 is issued from the retransmission control circuit 215 of the data transmitting/receiving apparatus 200 to the retransmission control circuit 114 of the data transmitting/receiving apparatus 100. The retransmission request signal 10 is received by the retransmission control circuit 114 of the data transmitting/receiving apparatus 100 after the lapse of a period of time corresponding to the speed of transfer and the distance of transfer between the two data transmitting/receiving apparatuses. FIG. 4 shows a case in which the retransmission control circuit 114 receives a retransmission request signal 10 after the data transmitting/receiving apparatus 100 transmits datum N.

The data transmitting/receiving apparatus 100, having received a retransmission request signal 10, interrupts data transmitting operation. However, since a period of time corresponding to the speed of transfer and the distance of transfer between the apparatuses is needed, as described above, from the detection of a transfer error for datum 2 by the data transmitting/receiving apparatus 200 until the reception of the retransmission request signal and the interruption of transmitting operation by the data transmitting/receiving apparatus 100, the data transmitting/receiving apparatus 100 on the transmitting side continues the data from datum 2 on, i.e. from datum 3 to datum N, during this period of time. As a result, the data transmitting/receiving apparatus 200 receives, even after detecting the transfer error for datum 2, the data up to datum N transferred from the data transmitting/receiving apparatus 100, and writes them into the transfer data buffer 210.

Next, the data transmitting/receiving apparatus 100 starts retransmitting operation. By this time, the read pointer in the data transmission control circuit 112 is updated for N data by the above-described transmitting operation. Therefore, a value set in the pointer subtraction established value setting circuit 118 is subtracted from the read pointer value at that point of time. As shown in FIG. 4, a subtraction established value for N data is subtracted from the read pointer value here. Incidentally, not unexpectedly, a value not smaller than the number of data number of data transmitted after the detection of a transfer error by the data transmitting/receiving apparatus on the receiving side until the interruption of transmitting operation by the data transmitting/receiving apparatus on the transmitting side is set as the established subtrahend.

And the data transmitting/receiving apparatus 100, using the read pointer having undergone subtraction, reads again the data from datum 1 on out of the transfer data buffer 10 and, at the same time, transmits a retransmission start flag indicating the start of transmission, thereafter retransmitting datum 1 to datum N.

The data transmitting/receiving apparatus 200, perceiving the start of retransmission by the transferred retransmission start flag, subtracts the value set in the pointer subtraction established value setting circuit 219 from the write pointer in the data reception control circuit 213 similarly to what the data transmitting/receiving apparatus 100 does. In the pointer subtraction established value setting circuit 219 is set the same value as in the pointer subtraction established value setting circuit 118 of the data transmitting/receiving apparatus 100, and accordingly an established subtrahend equivalent to N data is subtracted from the write pointer. And the data transmitting/receiving apparatus 200 receives the retransmit data from datum 1 to datum N which are retransmitted and, using the write pointer having undergone subtraction, overwrites the retransmit data into the transfer data buffer 210.

The data transmitting/receiving apparatus 100, upon completion of retransmission up to datum N, transmits a retransmission end flag. The data transmitting/receiving apparatus 200 perceives the completion of retransmission by receiving this retransmission end flag.

Unless the data transmitting/receiving apparatus 200 detects any transfer error in the retransmit data in the course of the foregoing retransmitting actions, the retransmission is completed and, as shown in FIG. 4, the data transmitting/receiving apparatus 100 and the data transmitting/receiving apparatus 200 resume transmission and reception of data from datum N+1 on anew. To add, though not shown in FIG. 4, if any transfer error has been detected in the retransmit data, the operation to retransmit datum 1 to datum N is repeated.

Next, data transfer actions in the parallel processor system of this embodiment having the above-described configuration will be explained.

Here is explained, as an example, a case in which data are transferred from the processing node N(0) to the processing node N(15) in the parallel processor system of FIG. 5.

The data transmitting/receiving apparatus 100 of the processing node N(0), in response to an instruction by the processor P within itself, stores in the transfer data buffer 110 the data read out of the memory M and to be transferred. And the data transmitting/receiving apparatus 100 of the processing node N(0), in accordance with the above-described transmitting procedure, i.e. the flowchart of transmitting actions of FIG. 2, transfers the data stored in the transfer data buffer 110 to the switching circuit S(00).

On the other hand, the data transmitting/receiving apparatus 200 in each of the switching circuits coupling the processing node N(0) and the processing node N(15) receives the data transferred from the processing node or switching circuit of the preceding stage in accordance with the above-described receiving procedure, i.e. the flowchart of receiving actions of FIG. 3, and stores them in the transfer data buffer 210. And the data transmitting/receiving apparatus 200 transfers the receive data, stored in the transfer data buffer 210, to the switching circuit or processing node of the next stage via the switching section in its switching circuit in accordance with the above-described transmitting procedure.

Suppose that a transfer error arises during such a data transfer for instance at point a shown in FIG. 5, i.e. between the processing node N(15) and the switching circuit S(05).

At this time, the data transmitting/receiving apparatus 100 of the processing node N(15) is receiving data transferred from the data transmitting/receiving apparatus 200 of the switching circuit S(05) in accordance with the above-described receiving procedure. And, in connection with the occurrence of the transfer error at point a, it detects a transfer error for a certain datum with the error detector 119, and issues a retransmission request signal 10 from the retransmission control circuit 120 to the data transmitting/receiving apparatus 200 of the switching circuit S(05). The data transmitting/receiving apparatus 200 of the switching circuit S(05), when its retransmission control circuit 220 receives the retransmission request signal 10, interrupts data transmission as described above and, using the data stored in the transfer data buffer 210, executes retransmitting operation. On the other hand, the data transmitting/receiving apparatus 100 of the processing node N(15) executes actions to receive the retransmit data as described above. Unless any transfer arises in this retransmitting operation, the data transmitting/receiving apparatus of the switching circuit S(05) and the data transmitting/receiving apparatus 100 of the processing node N(15) complete the retransmitting operation, and return to normal data transfer actions. And upon completion of the transfer of all the data to be transferred, the data transmitting/receiving apparatus 200 of the switching circuit S(05) and the data transmitting/receiving apparatus 100 of the processing node N(15) complete their respective transmitting/receiving actions. The data received by the data transmitting/receiving apparatus 100 of the processing node N(15) are stored into the memory M from the transfer data buffer 110.

As described so far, in this embodiment, each of the processing nodes and switching circuits constituting a parallel processor system is provided with a data transmitting/receiving apparatus 100 or 200 and, when a data transfer is to be accomplished from one processing node to another via an internodal network apparatus, even if a transfer error arises at any random point, such as between a processing node and a switching circuit or between switching circuits, retransmitting operation can be carried out within that point.

Furthermore, because the retransmission of any desired number of data can be retransmitted between data transmitting/receiving apparatuses, limitation on the speed of transfer and the distance of transfer between apparatuses can be eliminated.

As hitherto described, according to the present invention, each of the processing nodes and switching circuits constituting a parallel processor system is provided with a data transmitting/receiving apparatus and, when a data transfer is to be accomplished from any one processing node to another via an internodal network apparatus, even if a transfer error arises at any random point, such as between a processing node and a switching circuit or between switching circuits, retransmitting operation can be carried out within that point.

Therefore, it is become unnecessary, in the event of the occurrence of a transfer error, for the processing node on the transmitting side to retransmit the data every time. As a result, the overhead spent on the retransmission processing by processing nodes can be substantially reduced. Also, since retransmitting operation can be performed at any desired point, the reliability of the internodal network apparatus is enhanced. Moreover, as the data transmitting/receiving apparatuses can make variable the number of retransmit data at the time of retransmission, data retransmission can be accomplished, cleared of limitation on the speed of transfer and the distance of transfer between apparatuses. Furthermore, by using the transfer data buffers for use in data transfers as they are as the buffers for retransmit data, there is no need to separately provide latches for holding retransmit data or the like, making it possible to restrain the quantitative aspect of the hardware.

What is claimed is:

1. A parallel processor system, comprising:
   a plurality of processing nodes;
   at least one switching apparatus for coupling with said processing nodes one another;
   wherein each of said processing nodes transfer data to one another via said switching apparatus;
   each of said processing nodes having a first data transmitting/receiving apparatus for transmitting data to said switching apparatus and receiving data transmitted from said switching apparatus;
   said first transmitting/receiving apparatus including a first transfer data buffer, writing into said first transfer data buffer the data transmitted from said switching apparatus, and reading out from said first transfer data buffer the data transmitting to said switching apparatus;
   said switching apparatus having a second data transmitting/receiving apparatus for receiving data transmitted from any of connected processing nodes or another switching apparatus, and transmitting the data to a connected processing node or another switching apparatus for which they are destined;
   said second data transmitting/receiving apparatus including a second transfer data buffer, writing into said second transfer data buffer the data transmitted from said connected processing node or another switching apparatus, and reading out from said second transfer data buffer said data transmitting to said connected processing node or another switching apparatus;
   wherein said first data transmitting/receiving apparatus in the processing node on the receiving side, when it has detected any error in the received data, requests said second data transmitting/receiving apparatus in the switching apparatus on the transmitting side for retransmission of the data, and said second data transmitting/receiving apparatus in said switching apparatus on the transmitting side read out said data from said second transfer buffer in response to said request for retransmission, and retransmits said data; and
   wherein said second data transmitting/receiving apparatus in the switching apparatus on the receiving side, when it has detected any error in the received data, requests said first or second data transmitting/receiving apparatus in the processing node or other switching apparatus on the transmitting side for retransmission of the data, and said first or second data transmitting/receiving apparatus in said processing node or other switching apparatus on the transmitting side read out said data from said first or second transfer data buffer in response to said request for retransmission, and retransmits said data.

2. A parallel processor system, comprising:

a plurality of processing nodes;

at least one switching apparatus for coupling with said processing node one another;

wherein each of said processing nodes transfer data to one another via said switching apparatus;

each of said processing nodes having a first data transmitting/receiving apparatus for transmitting data to said switching apparatus and receiving data transmitted from said switching apparatus;

said switching apparatus having a second data transmitting/receiving apparatus for receiving data transmitted from any of processing nodes or another switching apparatus, and transmitting the data to a processing node or another switching apparatus for which they are destined;

each of said first and second data transmitting/receiving apparatuses having a transfer data buffer for temporarily holding a plurality of data to be transmitted or received, a transmission/reception control means for controlling the transmission/reception of data and the reading of transmit data from and the writing of receive data into said transfer data buffer, an error detecting means for detecting the presence or absence of any error in receive data, and a retransmission control means for issuing, when said error detecting means has detected any error, a retransmission request to the processing node or another switching apparatus on the transmitting side, and instructing, when it has received a retransmission request issued from the processing node or another switching apparatus on the receiving side, said transmission/reception control means to retransmit the data; and wherein said transmission/reception control means reads again and retransmits, in response to said instruction to retransmit, already transmitted data held in said transfer data buffer.

3. A parallel processor system, as claimed in claim 2, said transfer data buffer having a plurality of data holding areas, and holds data to be transmitted or received in said data holding areas consecutive in the sequence of transmission or in the sequence of reception;

said transmission/reception control means having a buffer control means for controlling a pointer for indicating each data holding area in said transfer data buffer; and wherein said buffer control means, in response to said instruction to retransmit, subtracts a predetermined subtrahend from said pointer, successively reads a plurality of already transmitted data equivalent to said subtrahend, held in areas following the data holding area indicated by the subtracted pointer, and said transmission/reception control means successively retransmits said already transmitted data that are read.

4. A parallel processor system, as claimed in claim 3, wherein said buffer control means, upon perception by said transmission/reception control means of the retransmission of already transmitted data from said processing node or switching apparatus on the transmitting side, subtracts a predetermined subtrahend from said pointer, successively reads the retransmitted already received data into areas following the data holding area indicated by said subtracted pointer.

5. A parallel processor system, as claimed in claim 3, each of said first and second data transmitting/receiving apparatuses having a subtrahend setting means in which any desired value from outside is set;

wherein said buffer control means subtracts the value set in said subtrahend setting means from said pointer as said subtrahend.

6. A parallel processor system, as claimed in claim 3, each of said first and second data transmitting/receiving apparatuses having a counting means for counting the number of retransmission retrials in response to counting instructions from said retransmission control means, a retrial value setting means in which any desired value from outside is set, and a comparing means for comparing the value counted by said counting means and the value set in said retrial value setting means to see whether or not they coincide with each other and, if they do, notifying said retransmission control means of the coincidence, and wherein said retransmission control means for instructing, upon receiving said retransmission request, said counting means to count, and instructing, upon perceiving the absence of said notification from said comparing means, said data transmitting/receiving control means to retransmit data.

* * * * *